(12) United States Patent
Kim et al.

(10) Patent No.: US 7,682,571 B2
(45) Date of Patent: Mar. 23, 2010

(54) MICRO-FLUIDIC HEATING SYSTEM

(75) Inventors: Sung Jin Kim, Daejeon-Shi (KR); Hae Sik Yang, Daejeon-Shi (KR); Dae Sik Lee, Daejeon-Shi (KR); Yong Taik Lim, Jeollabuk-Do (KR); Kwang Hyo Chung, Daejeon-Shi (KR); Kyu Won Kim, Daejeon-Shi (KR); Se Ho Park, Daejeon-Shi (KR); Yun Tae Kim, Daejeon-Shi (KR)

(73) Assignee: Electronics and Telecommunications Research Institute, Daejeon-Shi (KR)

( * ) Notice: Subject to any disclaimer, the term of this patent is extended or adjusted under 35 U.S.C. 154(b) by 1263 days.

(21) Appl. No.: 10/899,143

(22) Filed: Jul. 27, 2004

(65) Prior Publication Data

US 2005/0142036 A1 Jun. 30, 2005

(30) Foreign Application Priority Data

Dec. 26, 2003 (KR) .................. 10-2003-0097056

(51) Int. Cl.
*B01L 3/00* (2006.01)
(52) U.S. Cl. .................. 422/102; 422/68.1; 422/99; 422/100
(58) Field of Classification Search ............. 422/68.1, 422/82.01, 99–102; 436/147, 174, 180; 205/193, 205/400, 600, 601
See application file for complete search history.

(56) References Cited

U.S. PATENT DOCUMENTS 5,356,756 A 10/1994 Cavicchi et al.
(Continued)

FOREIGN PATENT DOCUMENTS

KR 1020030075359 9/2003
WO WO 98/38487 9/1998

OTHER PUBLICATIONS

Yinqjie Liu, et al.; "DNA Amplification and Hybridization Assays in Integrated Plastic Monolithic Devices"; *Analytical Chemistry*, vol. 74, No. 13, Jul. 1, 2002; pp. 3063-3070.
(Continued)

*Primary Examiner*—Jill Warden
*Assistant Examiner*—Dwayne K Handy
(74) *Attorney, Agent, or Firm*—Lowe Hauptman Ham & Berner LLP

(57) ABSTRACT

Provided is a micro-fluidic heating system, which comprises a micro-fluidic control element for providing a chamber, a flow path and a valve, and a main body for heating the inside of the chamber in contact with the micro-fluidic control element, wherein the micro-fluidic control element consists of an upper substrate for providing the chamber, the flow path and the valve, and a lower substrate as a thin film bonded to the upper substrate, and the main body consists of a membrane in which heating means and suction holes are formed, and support member for supporting the membrane, and the heating means is partially in contact with the lower substrate of the chamber to heat the inside of the chamber, so that thermal transfer efficiency becomes maximized and temperature of each chamber may be independently controlled in the case of configuration having chambers arranged in array.

24 Claims, 6 Drawing Sheets

U.S. PATENT DOCUMENTS

| | | | | |
|---|---|---|---|---|
| 6,132,580 | A | * | 10/2000 | Mathies et al. .............. 204/453 |
| 6,300,124 | B1 | | 10/2001 | Blumenfield et al. |
| 6,509,186 | B1 | | 1/2003 | Zou et al. |
| 6,572,830 | B1 | | 6/2003 | Burdon et al. |
| 6,692,700 | B2 | * | 2/2004 | Handique .................. 422/100 |
| 7,010,391 | B2 | * | 3/2006 | Handique et al. ........... 700/266 |
| 7,189,367 | B2 | * | 3/2007 | Yamamoto et al. .......... 422/100 |

OTHER PUBLICATIONS

Dae-Sik Lee, et al. ; "Submicroliter-Volume PCR Chip With Fast Thermal Response and Very Low Power Consumption"; 7$^{th}$ International Conference on Miniaturized Chemical and Biochemical Analysis systems, Oct. 5-9, 2003, Squaw Valley, California USA; 0-9743611-0-0/uTA2003/$15.00© 2003TRF; pp. 187-190.

Lee et al.; "Submicrofilter-Volume PCR Chip With Fast Thermal Response And Very Low Power Consumption; 7$^{th}$ International Conference on Miniaturized Chemical and Biochemical Analysis Systems"; Oct. 5-9, 2003; pp. 187-190.

Liu et al.; "DNA Amplification and Hybridization Assays in Integrated Plastic Monolithic Devices"; Analytical Chemistry; Jul. 1, 2002; pp. 3063-3070.

* cited by examiner

MICRO-FLUIDIC HEATING SYSTEM

BACKGROUND

1. Field of the Invention

The present invention generally relates to a micro-fluidic heating system applied in a micro automatic analysis system, and more particularly, to a micro-fluidic heating system that can be fabricated with a low cost and can be used as disposable applications and has fast heating and cooling speeds.

2. Discussion of Related Art

In general, a micro automatic analysis system such as a bio sensor, a bio chip, a High Throughput Screening (HTS) system, and a combinatory chemistry system requires a micro-fluidic control system having a heating function. Such a micro-fluidic control system requires a function of heating or cooling a single chamber or a plurality of chambers within the system in a short time.

To that end, methods for forming multi-layered flow patterns and integrating a plurality of chambers and heaters within a micro-fluidic control element have been researched (See U.S. Pat. No. 6,572,830; 3 Jun. 2003). However, when the heater is integrated in the micro-fluidic control element, the micro pattern for forming the heater and a temperature sensor should be formed within the element and its value should be compensated, which requires a lower portion of the chamber of the micro-fluidic control element to be formed as a membrane so as to enhance thermal transfer performance. As a result, a processing cost disadvantageously becomes increased.

A micro-fluidic control system is also proposed, which includes a micro-fluidic control element and a main body that are integrated together while having separated heating function (See Liu et al., "DNA amplification and hybridization assys in integrated plastic monolithic devices", Analytical chemistry, Vol. 74, No. 13, pp. 3063-3070). This system uses a peltier element having a high thermal mass as a heater, wherein the lower portion of the chamber of the micro-fluidic control element is made thick to have a thickness of 200 μm, which causes the thermal transfer speed to be decreased to degrees of 7.9° C./s in heating and 4.6° C./s in cooling.

A micro-fluidic control element comprising a membrane type heater and a single chamber has been proposed (See Lee et al., "Submicroliter volume PCR chip with fast thermal response and very low power consumption", Proc. Of Micro-TAS 2003, pp. 187-190, 2003. 10. 5). The micro-fluidic control element has a small heat transfer coefficient and uses a thin membrane of about 2 μm, so that it has a fast speed for heating and cooling to a degree of 60° C./s to 80° C./s. However, as the heating function is included in the micro-fluidic element for single use, which causes its fabrication process to be complicated.

An assembly has been proposed, wherein the heater and the single chamber are separated, and a contact portion on the side of the single chamber in contact with the heater is formed as a film, and the heater in a main body is formed as a thin thermal plate to enhance thermal transfer efficiency (See WO Publication No. 98/38487(1998. 9. 3), Chang Ronald et al., "Heat exchange, optically interrogated chemical reaction assembly"). In such a structure, the whole portion in contact with the micro-fluidic control element of the main body is used as a thermal plate, which fails to locally heat or cool only the chamber in a case of integrated micro-fluidic control element. Furthermore, the thermal plate is fabricated by a conventional machine processing method, so that the element has an increased thermal mass due to the thickness and size of its thermal plate, which fails to have fast heating and cooling speeds compared to the element fabricated by a surface micromachining process.

SUMMARY OF THE INVENTION

The present invention is directed to a micro-fluidic heating system, which separately comprises a main body including a heating means, and a micro-fluidic control element for providing a chamber and a flow path, wherein the inside of the chamber is heated while the heating means included in the main body is locally in contact with a lower thin substrate of the chamber.

One aspect of the present invention is to provide a micro-fluidic heating system, which comprises a micro-fluidic control element including an upper substrate for providing a chamber and a flow path for transporting micro fluid to the chamber, and a lower substrate bonded to the upper substrate so as to shield the chamber and the flow path; and a main body including a membrane, heating means formed on the membrane, and a support member for supporting the membrane, wherein the micro-fluidic control element and the main body are joined to each other so as to have the heating means of the main body contacted with the lower substrate of the chamber.

Another aspect of the present invention is to provide a micro-fluidic heating system, which comprises a micro-fluidic control element including an upper substrate for providing a plurality of chambers and a plurality of flow paths for transporting micro fluid to each chamber arranged in array, and a lower substrate bonded to the upper substrate so as to shield the chambers and the flow paths; and a main body including a membrane, a plurality of heating means formed on the membrane, and a support member for supporting the membrane, wherein the micro-fluidic control element and the main body are joined to each other so as to have each of the heating means of the main body contacted with the lower substrate of each of the chambers.

The micro-fluidic heating system further comprises a valve for controlling flow of micro fluid in the flow path of the upper substrate.

The upper and lower substrates are formed of a glass, a high molecule, or a metal, and the support member is formed of metal or silicon.

The lower substrate is formed to have a thickness of 1 μm to 100 μm, and the membrane is formed of a silicon nitride layer, a silicon oxide layer, or a synthetic high molecular material and has a thickness of 0.1 μm to 20 μm.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Figure 1A:
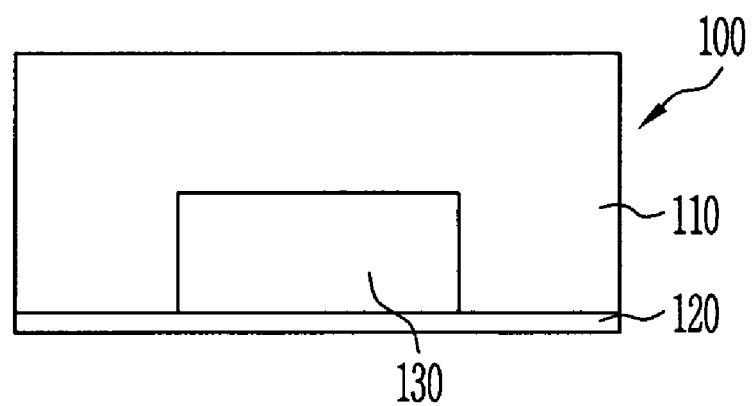
FIG. 1A and FIG. 1B are cross sectional views for illustrating a micro-fluidic heating system in accordance with a first embodiment of the present invention.

The present invention will now be described more fully hereinafter with reference to the accompanying drawings, in which preferred embodiments of the field emission device are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout the specification.

Figure 1B:
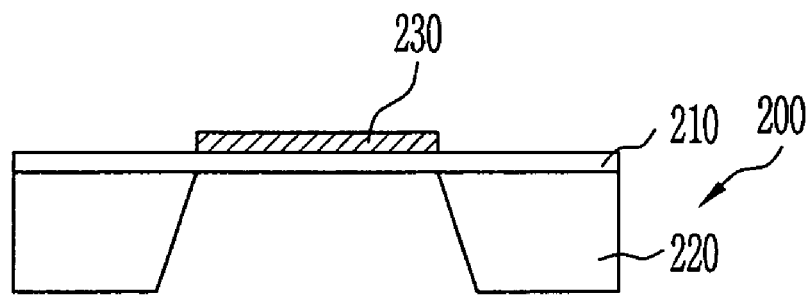
Figure 2A:
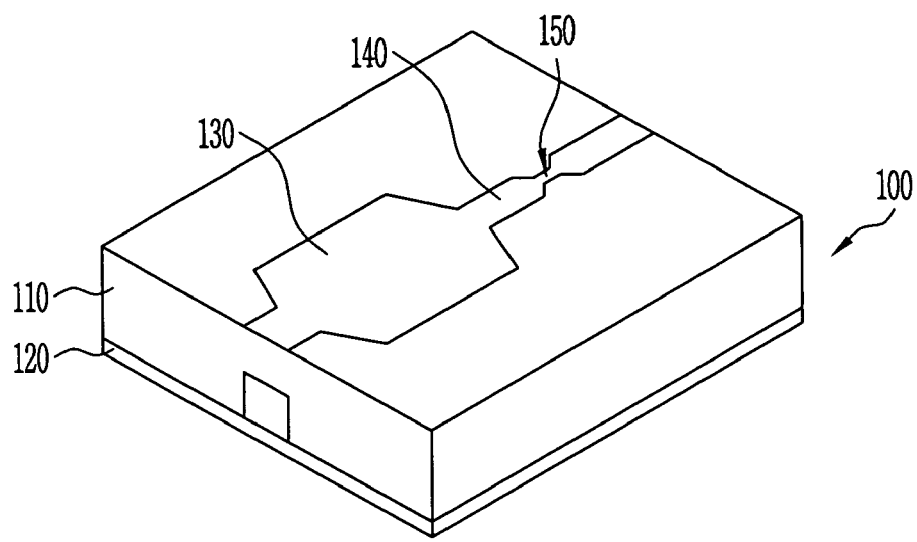
FIG. 2A and FIG. 2B are perspective views for illustrating a micro-fluidic heating system in accordance with the first embodiment of the present invention.
Figure 2B:
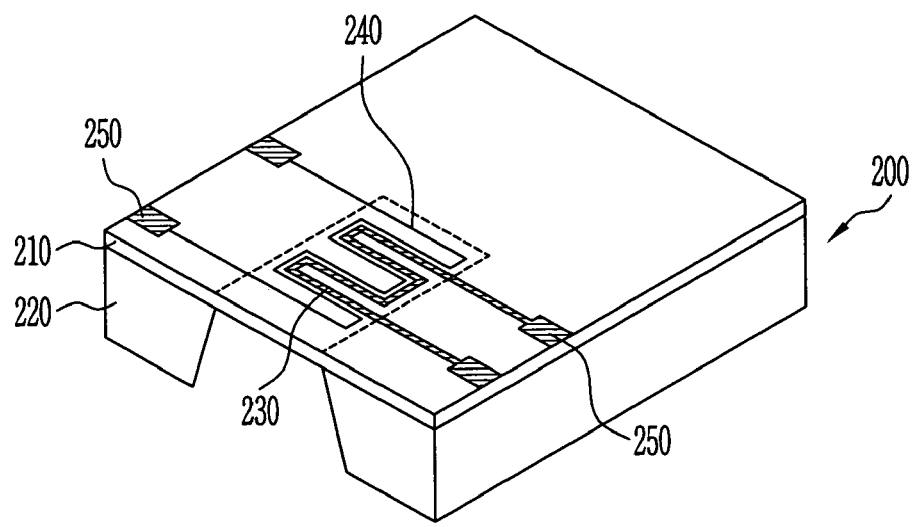

FIG. 1A and FIG. 1B are cross sectional views for illustrating a micro-fluidic heating system in accordance with a first embodiment of the present invention, and FIG. 2A and FIG. 2B are perspective views for illustrating a micro-fluidic heating system in accordance with the first embodiment of the present invention.

The micro-fluidic heating system in accordance with the first embodiment of the present invention comprises a micro-fluidic control element for providing a chamber, a flow path and a valve, and a main body for heating the chamber and connected to the micro-fluidic control element. FIG. 1A and FIG. 2A show the micro-fluidic control element, and FIG. 1B and FIG. 2B show the main body.

Referring to FIG. 1A and FIG. 2A, the micro-fluidic control element 100 is comprised of an upper substrate 110 and a lower substrate 120. The upper substrate 110 has a chamber 130, a flow path 140 for transporting the micro fluid to the chamber 130 and so forth formed in a negative pattern. The flow path 140 may have a valve 150 for controlling flow of the micro fluid to be transported. The lower substrate 120 is bonded to the upper substrate 110 so as to shield the chamber 130, the flow path 140, and the valve 150.

Any material such as a glass, a high molecule, or a metal may be employed for the upper substrate 110 and the lower substrate 120, and a photoresist such as SU-8 allowing photolithography to be performed, or a transparent polymer such as polydimethylsiloxane (PDMS), polymethylmethacrylate (PMMA), polycarbonate (PC), cycloolefin copolymer (COC), polyamide(PA), polyethylene (PE), polypropylene (PP), polyphenylene ether (PPE), polystyrene (PS), polyoxymethylene (POM), polyetheretherketone (PEEK), polytetrafluoroethylene (PTFE), polyvinylchloride (PVC), polyvinylidene fluoride (PVDF), polybutyleneterephthalate (PBT), fluorinated ethylenepropylene (FEP), perfluoralkoxyalkane (PFA), poly(ethylene terepthalate)) (PET) may be used in general. The upper substrate 110 may be fabricated by a casting method, an injection molding method, and a hot embossing method, wherein a silicon structure or metal fabricated by a semiconductor processing method using etch and photolithography or traditional processing machine method such as laser ablation, rapid prototyping and numerical control machining, is used as a master. The lower substrate 120 may be formed by press molding the high molecular material to make it thin. In this case, the lower substrate 120 is preferably formed to a thickness of 1 μm to 100 μm so as to reduce its thermal mass. The upper substrate 110 and the lower substrate 120 may be bonded to each other by means of typical bonding agent, welding, ultrasonic waves, thermal bonding, or adhesive based on materials to be used.

Referring to FIG. 1B and FIG. 2B, the main body 200 includes a thin film type membrane 210, a micro heater 230 formed as a metal pattern on the membrane 210, and a support member 220 for supporting the membrane 210. A temperature sensor 240 for detecting a temperature may be formed as a metal pattern in the membrane 210, and the heater 230 and the temperature sensor 240 are connected to an electrode pad 250 formed in a peripheral portion of the membrane.

The membrane 210 may be formed of a silicon nitride layer, a silicon oxide layer, or a synthetic high molecular material, which is preferably formed to have a thickness of 0.1 μm to 20 μm so as to minimize its thermal mass. The support member 220 is fabricated by a semiconductor processing method employing metal or silicon with a high heat transfer coefficient. In addition, the micro heater 230, the temperature sensor 240, and the electrode pad 250 are formed of a conductive metal material such as platinum, gold, aluminum, and so forth.

The micro-fluidic control element 100 and the main body 200 are joined to each other so as to allow the micro heater 230 of the main body 200 to be contacted with the lower substrate 120 of the chamber 130. A mechanical pressing device such as a clip, a spring, etc. may be used to join the micro-fluidic control element 100 to the main body 200. Or suction may be used to join the micro-fluidic control element 100 to the main body 200.

Hereinafter, operation of the micro-fluidic heating system having the above-mentioned configuration in accordance with the present invention will be described.

When a current is flown to the micro heater 230 through the electrode pad 250, the micro heater 230 is heated. In this case, the support member 220 formed of metal or silicon having a superior heat transfer property is in contact with external air so that the heat of the micro heater 230 is transported to a certain degree, however, it still remains at a room temperature to thereby increase the temperature of the portion only where the membrane 210 is arranged.

Heat generated from the micro heater 230 is transported to the lower substrate 120 of the micro-fluidic control element 100 to thereby heat the inside of the chamber 130. In this case, the lower substrate 120 and the membrane 210 are formed as thin films so that they have a small thermal mass and are heated at a fast speed, however, a portion except the membrane 210 of the main body 200, namely, the support member 220 is maintained at a room temperature so that the valve 150 and the flow path 140 adjacent to the chamber 130 of the micro-fluidic control element 100 may maintain a room temperature. In addition, the room temperature is always kept at the support member 220 and the thermal mass of the micro-fluidic control element 100 and the main body 200 is small, so that the chamber 130 may be cooled down in a short time.

Figure 3A:
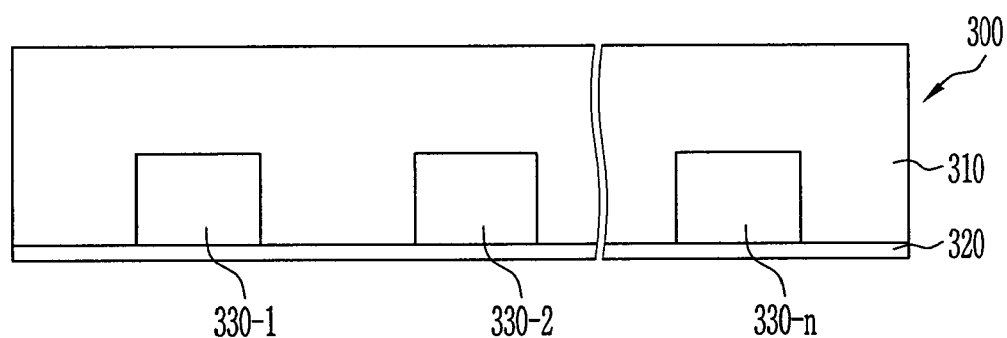
FIG. 3A and FIG. 3B are cross sectional views for illustrating a micro-fluidic heating system in accordance with a second embodiment of the present invention.
Figure 3B:
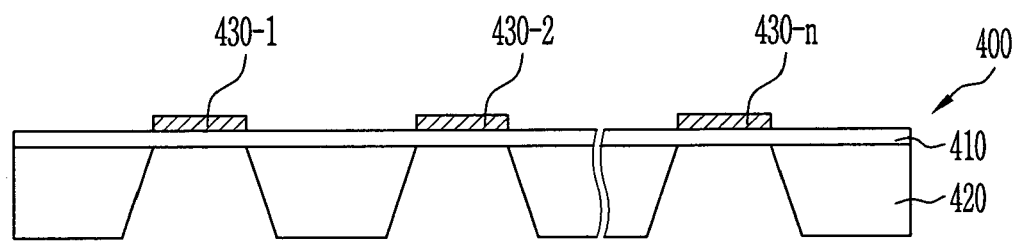
Figure 4A:
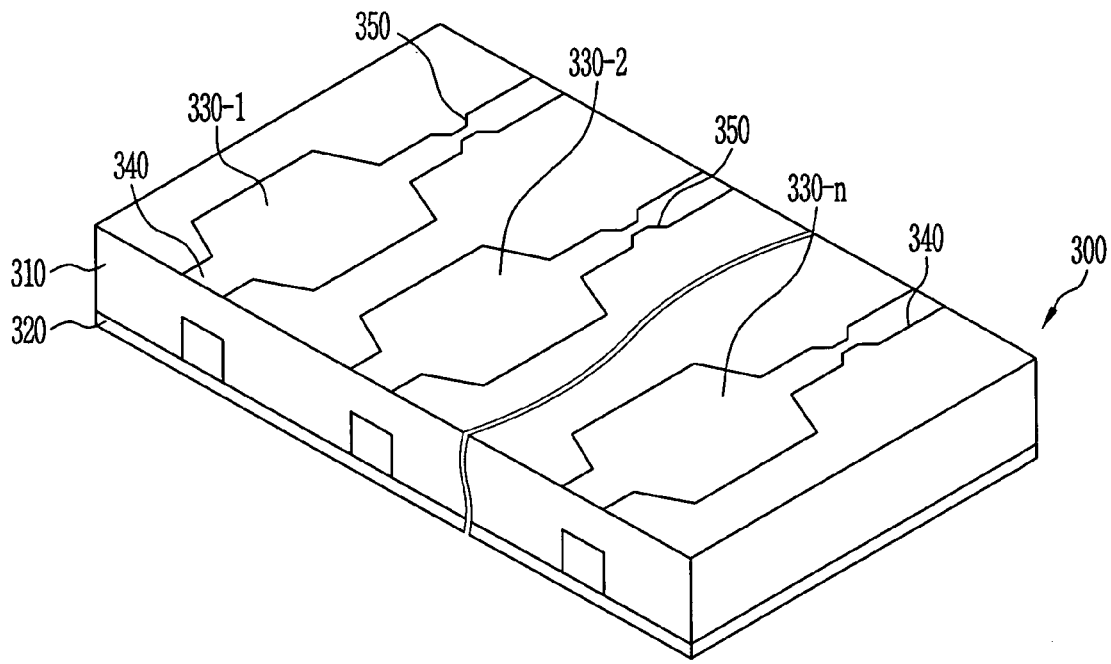
FIG. 4A and FIG. 4B are perspective views for illustrating a micro-fluidic heating system in accordance with the second embodiment of the present invention.
Figure 4B:
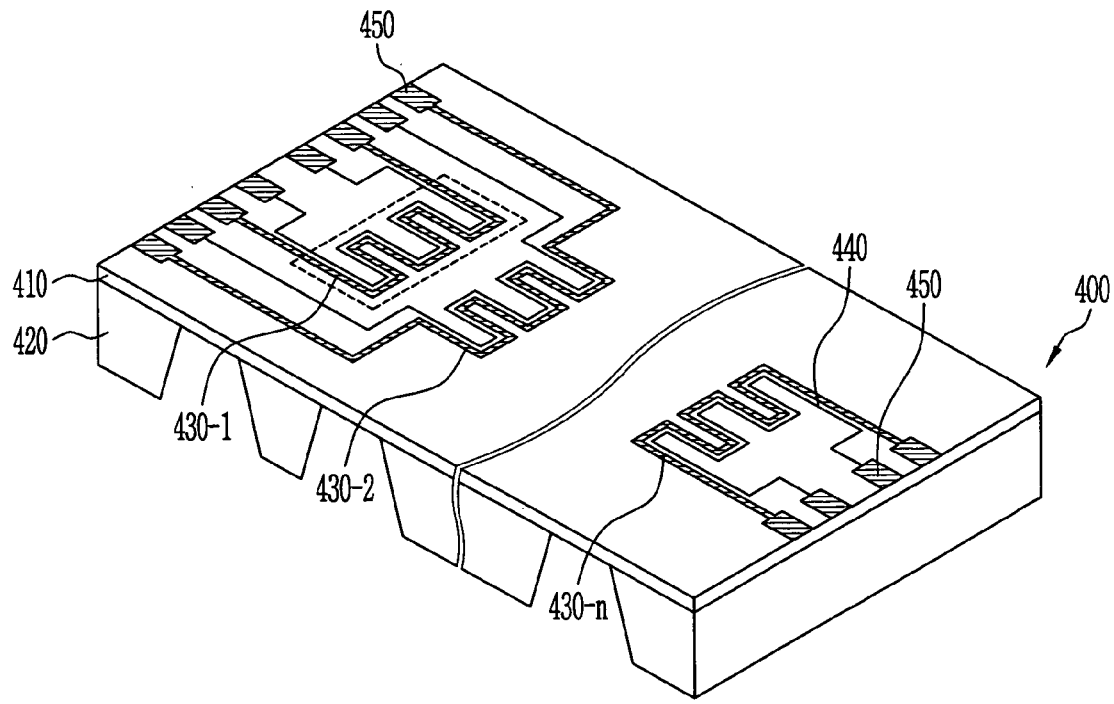

FIG. 3A and FIG. 3B are cross sectional views for illustrating a micro-fluidic heating system in accordance with a second embodiment of the present invention, and FIG. 4A and FIG. 4B are perspective views for illustrating a micro-fluidic heating system in accordance with the second embodiment of the present invention.

The micro-fluidic heating system in accordance with the second embodiment of the present invention comprises a micro-fluidic control element for providing a plurality of chambers, a flow path and a valve, and a main body for heating each chamber and in contact with the micro-fluidic control element. FIG. 3A and FIG. 4A show the micro-fluidic control element, and FIG. 3B and FIG. 4B show the main body.

Referring to FIG. 3A and FIG. 4A, the micro-fluidic control element 300 is comprised of an upper substrate 310 and a lower substrate 320. The upper substrate 310 includes a plurality of chambers 330-1 to 300-n arranged in array, and a plurality of flow paths for micro-fluidic transport connected to both ends of each chamber 330-1 to 300-n, which are formed in a negative pattern. The valve 350 for controlling flow of the micro-fluid may be formed in each flow path 340. The lower substrate 320 is bonded to the upper substrate 310 so as to shield the chambers 330-1 to 330-n, the flow path 340, and the valve 350.

Referring to FIG. 3B and FIG. 4B, the main body 400 includes a thin film type membrane 410, micro heaters 430-1 to 430-n formed as metal patterns on the membrane 410, and a support member 420 for supporting the membrane 410. A temperature sensor 440 for detecting a temperature may be formed as a metal pattern in the membrane 410, and the heaters 430-1 to 430-n and the temperature sensor 440 are connected to an electrode pad 450 formed in a peripheral portion of the membrane 410.

The micro-fluidic control element 300 and the main body 400 are joined to each other so as to allow each of the micro heaters 430-1 to 430-n of the main body 400 to be contacted with the lower substrate 320 of each of the chambers 330-1 to 330-n.

Hereinafter, operation of the micro-fluidic heating system having the above-mentioned configuration in accordance with the present invention will be described.

Basic operation of the micro-fluidic heating system in accordance with the second embodiment of the present invention is the same as the first embodiment, however, the second embodiment differs from the first embodiment in that the chambers 330-1 to 330-n and the heaters 430-1 to 430-n are placed in array, thereby capable of heating all or some of chambers 330-1 to 330-n. In other words, when a current is flown to the micro heater 430-2 through the electrode pad 450, the micro heaters 430-1, 430-3 to 430-n are not heated except the heater 430-2, which leads to maintaining a room temperature.

In accordance with the second embodiment of the present invention, amount of each current flowing through the micro heaters 430-1 to 430-n arranged in array on the membrane 410 is set to be different from each other to thereby have a different amount of heating for each of the micro heaters 430-1 to 430-n, which leads to control of the temperature inside of each chamber in contact with the micro heaters 430-1 to 430-n. In addition, the support member 420 is maintained at a room temperature, so that the flow path 340 and the valve 350 in contact with the chambers 330-1 to 330-n of the micro-fluidic control element 310 may maintain a room temperature.

Figure 5:
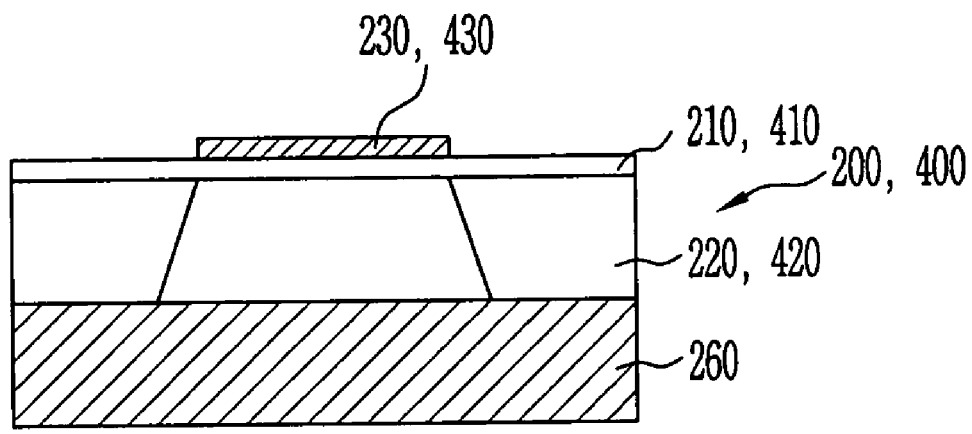
FIG. 5 is a cross sectional view for illustrating a micro-fluidic heating system in accordance with a third embodiment of the present invention.

FIG. 5 is a cross sectional view for illustrating a micro-fluidic heating system in accordance with a third embodiment of the present invention.

The micro-fluidic heating system in accordance with the third embodiment of the present invention may applied to structures of both of the first and second embodiments. To detail this, a cooling plate 260 is attached below the support member 220 or 420 of the main body 100 or 200. The temperature of the support member 220 or 420 for supporting the main body 100 or 200 using the cooling plate 260 is maintained at or below a room temperature, so that the chamber 130 or 330 may be cooled in a short time. The cooling plate 260 may be fabricated with metal having a high thermal transfer coefficient, and a water cooling tube may be formed inside of the cooling plate so as to perform partial cooling.

Figure 6A:
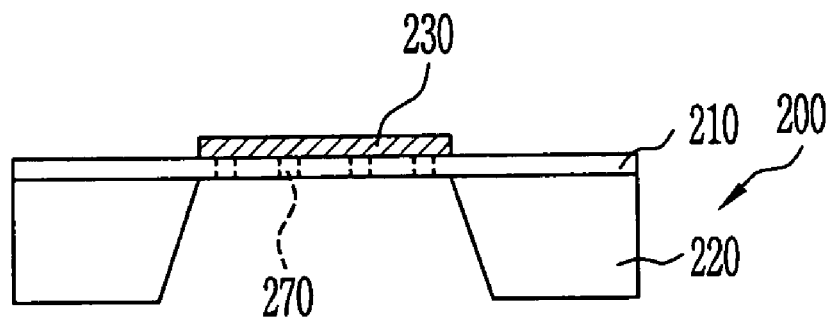
FIG. 6A and FIG. 6B are cross sectional and perspective view for illustrating a micro-fluidic heating system in accordance with a fourth embodiment of the present invention, respectively.
Figure 6B:
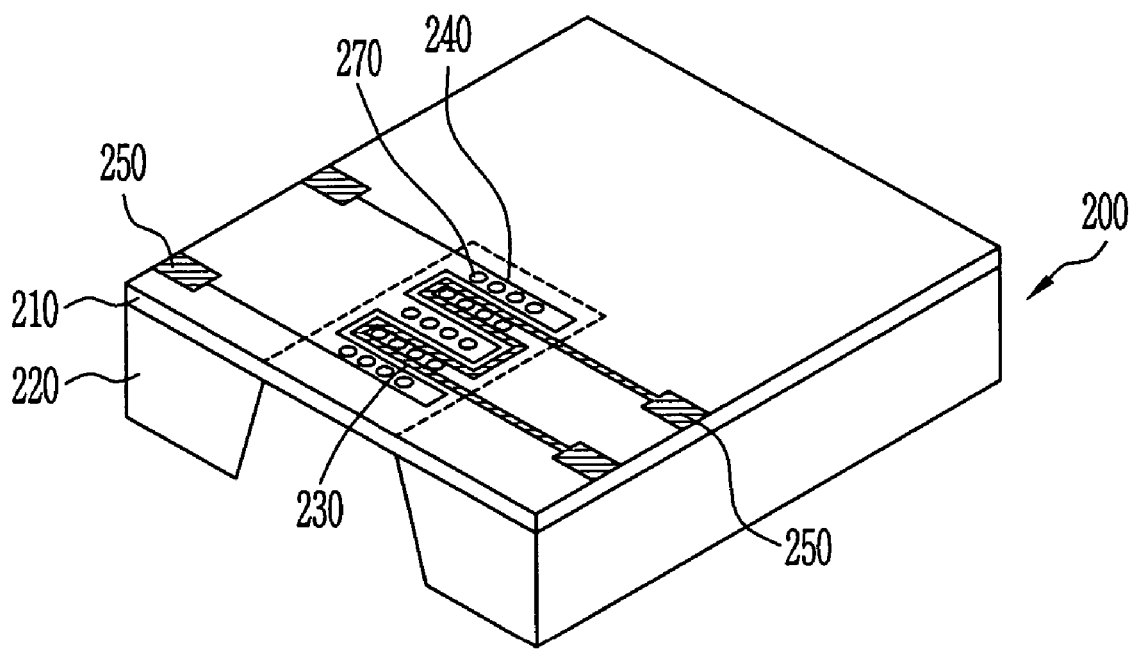

FIG. 6A and FIG. 6B are cross sectional and perspective view for illustrating a micro-fluidic heating system in accordance with a fourth embodiment of the present invention, respectively.

The micro-fluidic heating system in accordance with the fourth embodiment of the present invention may applied to structures of both of the first and second embodiments. To detail this, suction holes 270 are formed in the membrane 210. Due to the limitation of the fabrication process and the thickness, lower substrate 120 is usually bent. Without suction to join the micro-fluidic control element 100 and the main body 200, the irregular air gaps exist between them. These air gaps are the cause of the temperature variation when the micro-fluidic control element 100 and the main body 200 joined and heated repeatedly. With suction through the suction holes 270, the temperature variation can be significantly reduced. Suction by syringe or vacuum pump may be used to join the micro-fluidic control element 100 to the main body 200.

As mentioned above, the micro-fluidic heating system of the present invention comprises a main body including a heating means, and a micro-fluidic control element for providing a chamber and a flow path. The heating means formed in the main body heats the inside of the chamber while in contact with the lower thin substrate of the chamber, so that heat transfer efficiency becomes maximized to thereby increase heating speed when the chamber is heated, and cooling time is reduced because the portion except the chamber is maintained at a room temperature. In addition, the chambers are arranged in array in the micro-fluidic control element, and a plurality of heating means are arranged in the main body to correspond to each chamber, so that the temperature of each chamber may be independently controlled.

The heating means is added to a reusable main body, so that the configuration of the micro-fluidic control element becomes simplified to thereby simplify the fabrication process and reduce its cost. Therefore, the micro-fluidic heating system is advantageous for disposable application with a low cost.

While the present invention has been described with reference to a particular embodiment, it is understood that the disclosure has been made for purpose of illustrating the invention by way of examples and is not limited to limit the scope of the invention. And one skilled in the art can make amend and change the present invention without departing from the scope and spirit of the invention.

What is claimed is:

1. A micro-fluidic heating system, comprising:
a micro-fluidic control element including an upper substrate further comprising a chamber and a flow path for transporting micro fluid to the chamber, and a lower substrate bonded to the upper substrate so as to shield the chamber and the flow path; and
a reusable main body including a thin-film membrane, heating means and a temperature sensor formed on a same surface of the thin-film membrane, and a support member for supporting the thin-film membrane,
wherein the micro-fluidic control element and the reusable main body are releasably joined to each other so as to have the heating means of the main body contacted with the lower substrate of the chamber; and
wherein the lower substrate is formed to have a thickness of 1 μm to 100 μm.

2. The micro-fluidic heating system as claimed in claim 1, further comprising:
a valve for controlling flow of micro fluid formed in the flow path of the upper substrate.

3. The micro-fluidic heating system as claimed in claim 1, wherein the heating means is a micro heater.

4. The micro-fluidic heating system as claimed in claim 1, further comprising:
electrode pads formed on the same surface of the thin-film membrane and connected to the heating means and the temperature sensor.

5. The micro-fluidic heating system as claimed in claim 1, further comprising:
a cooling plate attached below the support member.

6. The micro-fluidic heating system as claimed in claim 1, wherein a plurality of suction holes are formed through the thin-film membrane from an upper surface to a lower surface thereof, the upper surface of the thin-film membrane configured to abut and attach to a bottom surface of the micro-fluidic control element via suction applied through the plurality of suction holes.

7. The micro-fluidic heating system as claimed in claim 1, wherein the upper and lower substrates are formed of any one of a glass, a high molecule, and a metal.

8. The micro-fluidic heating system as claimed in claim 6, wherein the high molecule includes any one of PDMS, PMMA, PC, COC, PA, PE, PP, PPE, PS, POM, PEEK, PTFE, PVC, PVDF, PBT, FEP, PFA, and PET.

9. The micro-fluidic heating system as claimed in claim 1, wherein the thin-film membrane is formed of any one of a silicon nitride layer, a silicon oxide layer, and a synthetic high molecular material, and has a thickness of 0.1 µm to 20 µm.

10. The micro-fluidic heating system as claimed in claim 1, wherein the support member is formed of any one of metal and silicon.

11. A micro-fluidic heating system, comprising:
a micro-fluidic control element including an upper substrate further comprising a plurality of chambers and a plurality of flow paths for transporting micro fluid to each chamber arranged in array, and a lower substrate bonded to the upper substrate so as to shield the chambers and the flow paths; and
a reusable main body including a thin-film membrane, a plurality of heating means and a temperature sensor formed on a same surface of the thin-film membrane, and a support member for supporting the thin-film membrane,
wherein the micro-fluidic control element and the main body are releasably joined to each other so as to have each of the heating means of the main body contacted with the lower substrate of each of the chambers; and
wherein the lower substrate is formed to have a thickness of 1 µm to 100 µm.

12. The micro-fluidic heating system as claimed in claim 11, further comprising:
a valve for controlling flow of micro fluid formed in the flow path of the upper substrate.

13. The micro-fluidic heating system as claimed in claim 11, wherein the heating means is a micro heater.

14. The micro-fluidic heating system as claimed in claim 11, further comprising:
electrode pads formed on the same surface of the thin-film membrane and connected to the heating means and the temperature sensor.

15. The micro-fluidic heating system as claimed in claim 11, further comprising:
a cooling plate attached below the support member.

16. The micro-fluidic heating system as claimed in claim 11, wherein a plurality of suction holes are formed through the thin-film membrane from an upper surface to a lower surface thereof, the upper surface of the thin-film membrane configured to abut and attach to a bottom surface of the micro-fluidic control element via suction applied through the plurality of suction holes.

17. The micro-fluidic heating system as claimed in claim 11, wherein the upper and lower substrates are formed of any one of a glass, a high molecule, and a metal.

18. The micro-fluidic heating system as claimed in claim 15, wherein the high molecule includes any one of PDMS, PMMA, PC, COC, PA, PE, PP, PPE, PS, POM, PEEK, PTFE, PVC, PVDF, PBT, FEP, PFA, and PET.

19. The micro-fluidic heating system as claimed in claim 11, wherein the thin-film membrane is formed of any one of a silicon nitride layer, a silicon oxide layer, and a synthetic high molecular material, and has a thickness of 0.1 µm to 20 µm.

20. The micro-fluidic heating system as claimed in claim 11, wherein the support member is formed of any one of metal and silicon.

21. The micro-fluidic heating system as claimed in claim 11, further comprising means for mechanically joining the micro-fluidic control element and the main body.

22. A micro-fluidic heating system, comprising:
a micro-fluidic control element including an upper substrate further comprising a chamber and a flow path for transporting micro fluid to the chamber, and a lower substrate bonded to the upper substrate so as to shield the chamber and the flow path;
a reusable main body including a thin-film membrane, heating means and a temperature sensor formed on a same surface of the thin-film membrane, and a support member for supporting the thin-film membrane; and
non-permanent means for joining the micro-fluidic control element to the reusable main body so as to have the heating means of the main body contacted with the lower substrate of the chamber.

23. The micro-fluidic heating system as claimed in claim 22, wherein the non-permanent means includes:
a plurality of suction holes formed through the thin-film membrane from an upper surface to a lower surface thereof, the upper surface of the thin-film membrane configured to abut and attach to a bottom surface of the micro-fluidic control element via suction applied through the plurality of suction holes; and
a means for applying a suction through the suction holes.

24. The micro-fluidic heating system as claimed in claim 22, wherein the non-permanent means includes a mechanical pressing device.

* * * * *